United States Patent [19]

Chang et al.

[11] Patent Number: 4,762,666
[45] Date of Patent: Aug. 9, 1988

[54] AUTOMATICALLY CLOSING SWING GATE CLOSURE ASSEMBLY

[75] Inventors: Shih-Chih Chang; William J. Schuck, both of Richland; Richard F. Gilmore, Kennewick, all of Wash.

[73] Assignee: The United States of America as represented by the United States Department of Energy, Washington, D.C.

[21] Appl. No.: 868,223

[22] Filed: May 28, 1986

[51] Int. Cl.⁴ .............................................. G21C 19/19
[52] U.S. Cl. ..................................... 376/264; 376/203
[58] Field of Search .................. 376/203, 264, 269; 137/494, 527.8

[56] References Cited

U.S. PATENT DOCUMENTS

| | | | |
|---|---|---|---|
| 1,827,913 | 10/1931 | Rymal | 137/527.8 |
| 3,020,225 | 2/1962 | Wootton | 376/269 |
| 3,066,089 | 11/1962 | Davies | 376/269 |
| 4,063,570 | 12/1977 | Mitchell et al. | 137/527.8 |
| 4,230,150 | 10/1980 | Scaramucci | 137/527.8 |
| 4,266,569 | 5/1981 | Wilson | 137/527.8 |
| 4,396,034 | 8/1983 | Cherniak | 137/527.8 |
| 4,469,122 | 9/1984 | Meek | 137/527.8 |

Primary Examiner—Deborah L. Kyle
Assistant Examiner—Richard L. Klein
Attorney, Agent, or Firm—D. C. Abeles

[57] ABSTRACT

A swing gate closure assembly for nuclear reactor tipoff assembly wherein the swing gate is cammed open by a fuel element or spacer but is reliably closed at a desired closing rate primarily by hydraulic forces in the absence of a fuel charge.

13 Claims, 10 Drawing Sheets

AUTOMATICALLY CLOSING SWING GATE CLOSURE ASSEMBLY

The present invention was generated under Government Contract DE-AC06-76FF02170.

FIELD OF THE INVENTION

The present invention relates to a swing gate closure assembly and more particularly to a swing gate closure assembly for a nuclear reactor which uses hydraulic forces coupled with the weight of the swing gate to provide a foolproof closure mechanism.

BACKGROUND OF THE INVENTION

When nuclear fuel is depleted, it must, of course, be removed from the reactor process area or core so that it may be replaced with fresh fuel. One current method for effecting removal involves introducing water under pressure into the tube holding the fuel charge. This causes the fuel charge to move through the tube to the end of the tube, where it is expelled. A fuel charge generally comprises about sixteen fuel elements arranged in the tube by spacers at either end.

When a charge/discharge operation is not in effect, the reactor tubes are typically sealed by an arrangement such as that shown in FIG. 1. In FIG. 1, the nozzle end of the process tube is indicated by numeral 10. The arrow in outline indicates a direction of flow. Nozzle cap 40 is threaded onto the nozzle 10. The nozzle 10 is also sealed by a seal plate 20 and graphoil seal 30. The seal plate 20 is loaded by three loading bolts 50, two of which are visible in FIG. 1.

When it is desired to effect fuel discharge, it is necessary for an operator to remove nozzle cap 40 and seal plate 20. This clears the way for the fuel charge to leave the process tube nozzle 10. A problem which exists, however, is that after the last spacer of the fuel charge has cleared the tube, water which has just traversed the radioactive core gushes out and sprays the operator. This imposes an undesirably high risk of radioactive contamination.

It is therefore desirable to provide a mechanism by which the nozzle 10 can automatically close after the final fuel spacer has cleared the tube. At the same time, it is necessary that any such mechanism function extremely reliably given the high safety standards required for nuclear reactor applications.

SUMMARY OF THE INVENTION

It is therefore an object of the present invention to provide a reliable closure assembly.

It is a further object of the invention to provide a swing gate closure assembly which permits fuel elements to be removed from a reactor core but which is responsive when the last fuel spacer has cleared the tube to swing closed automatically.

Additional objects, advantages and novel features of the invention will be set forth in part in the description which follows and in part will become apparent to those skilled in the art upon the examination of the following or may be learned by practice of the invention.

To achieve the foregoing and in accordance with the purposes of the invention, as embodied and broadly described herein, there is provided a swing gate closure assembly for a nuclear reactor tip off assembly comprising a closure assembly body having an inlet, an outlet, and a through bore dimensioned to permit passage of a fuel charge therethrough; a swing gate, moveable between a first position in which said swing gate does not seal said through bore and a second position in which said swing gate seals said through bore, is disposed in the closure body. The swing gate is moved to the first position by the fuel charge during passage of the fuel charge through the through bore; the assembly includes a device in the body and in fluid communication with the inlet to hydraulically move the swing gate to the second position when the last fuel spacer of the fuel charge has cleared the through bore.

The swing gate closure assembly of the present invention does not obstruct egress of fuel elements or spacers, and is capable of ready, rapid, and reliable closure in the absence of a fuel element or spacer. Closure is not effected through the provision of mechanical closing means, but instead is effected by forces generated by the fluid itself. These forces, coupled with the weight and moments of the swing gate, provide a virtually foolproof closing mechanism.

BRIEF DESCRIPTION OF THE DRAWINGS

These and other features and advantages of the subject invention will be most readily understood from the following description read in conjunction with the drawings, in which.

DETAILED DESCRIPTION OF THE PREFERRED EMBODIMENTS

Reference will now be made on detail to the presently preferred embodiment of the invention, an example which is illustrated in the accompanying drawings.

Figure 1:
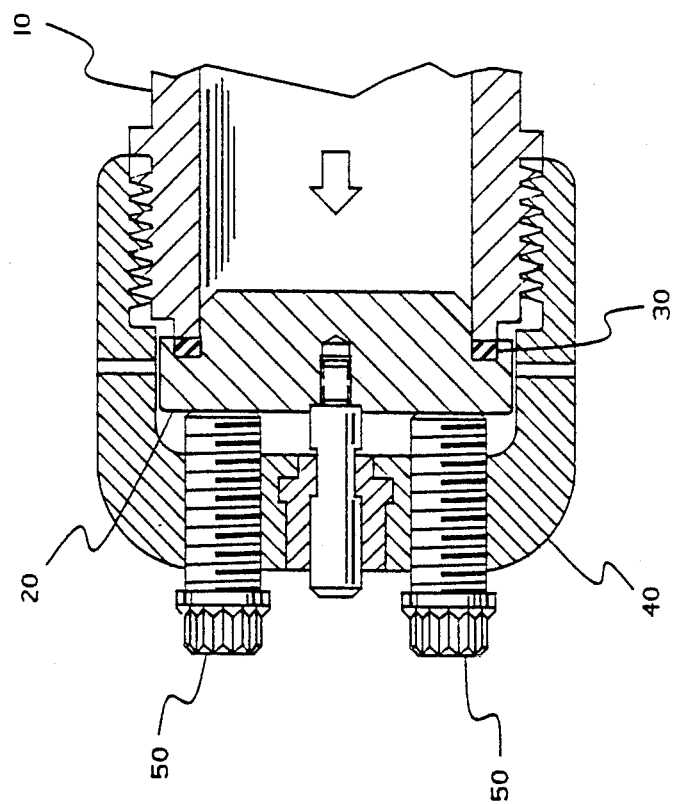
FIG. 1 is a cross-sectional view of a prior art nozzle discharge cap arrangement, described above.
Figure 2:
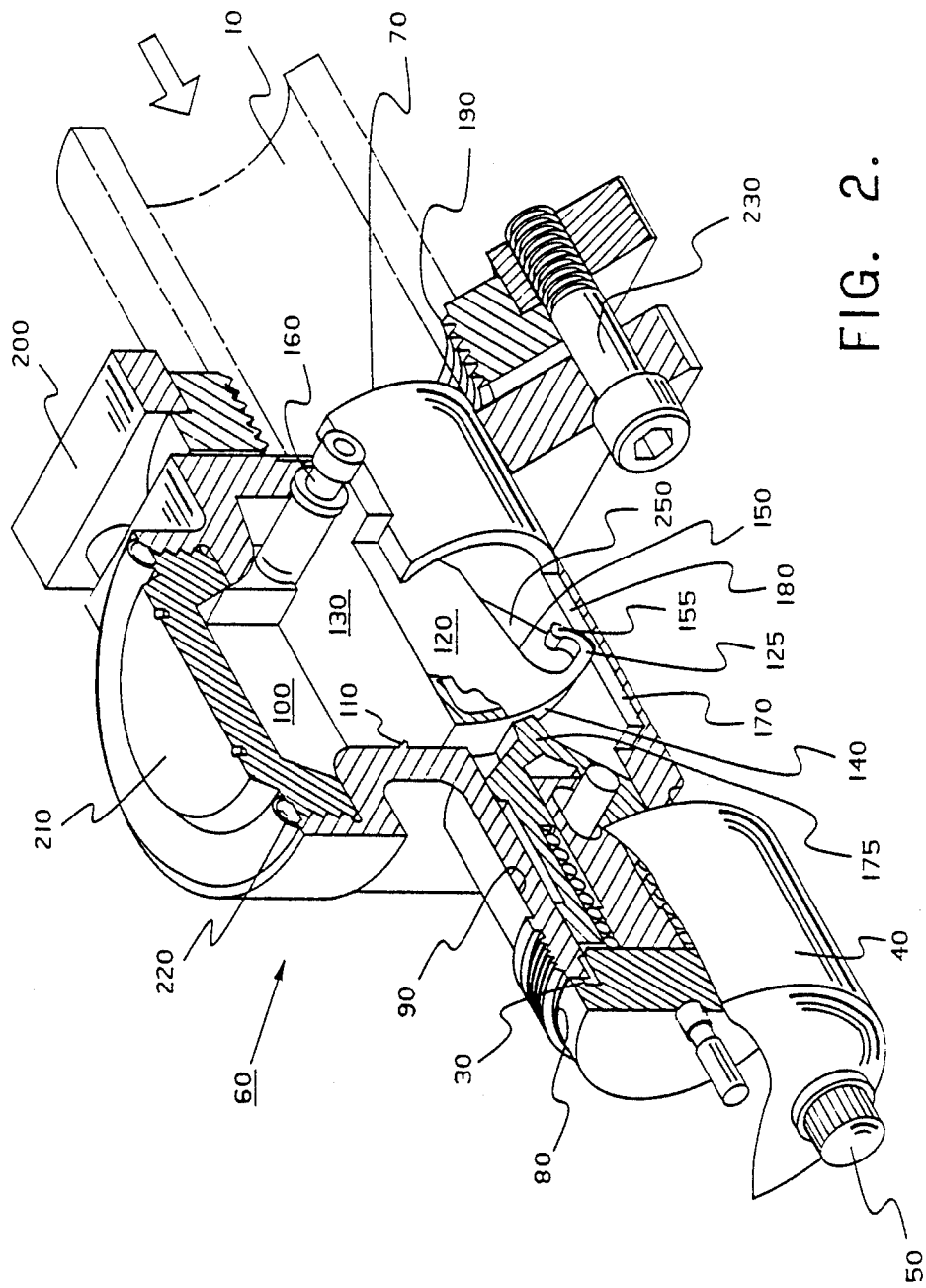
FIG. 2 is a perspective, partially cut away view of an automatically closing swing gate closure assembly according to one embodiment of the present invention.

In FIG. 2, nozzle cap 40 and seal loading bolts 50 are essentially the same as those shown in FIG. 1. Interposed between the nozzle cap 40 and nozzle 10, however, is the housing 60 of an automatically closing swing gate closure assembly according to the present invention. This closure assembly includes an inlet 70, an outlet 80, and a through bore 90 which provides a path of fluid communication between the inlet 70 and outlet 80. The housing 60 also defines an upper chamber 100 disposed above the through bore 90. This upper chamber 100 is in fluid communication with inlet 70 through orifice 110. Orifice 110 is located in swing gate 120.

Swing gate 120 includes an upper planar surface 130 which defines a bottom surface for upper chamber 100. It also includes an arcuate surface 140 facing outlet 80 and a concave surface 150 facing the inlet 70. In the embodiment shown in FIG. 2, the concave surface 150 is partially convolute to form an upward projection 155. The convolution is about an axis parallel to the pivot axis of the swing gate 120. As will be explained more fully below, the flow in the area under swing gate 120 while it is closing is largely vortexing. The concave surface 150 establishes boundary conditions tending to support such flow.

The swing gate is arranged to pivot about a pivot 160 arranged on a horizontal axis above through bore 90, adjacent inlet 70, and perpendicular to a central axis of through bore 90. As will be described in more detail below, the center of curvature of arcuate surface 140 is displaced from pivot 160.

The inside of the closure assembly housing includes a seat 170 which receives the surface 140 of swing gate 120. Seat 170 may be in the form of an insert, as shown. The sealing surfaces of the closure assembly's gate and seat 170 are preferably precision fit with metal-to-metal arc contact. Sleeve 180 is upstream from seat 170.

The arrangement shown in FIG. 2 also includes a locking plug or plunger 175 which is received in an aperture in swing gate 120 and locks it in the position in FIG. 2. It also includes a nozzle seal 190, a collar 200, an access cover 210, an omega seal 220, and attachment bolts 230.

Figure 3:
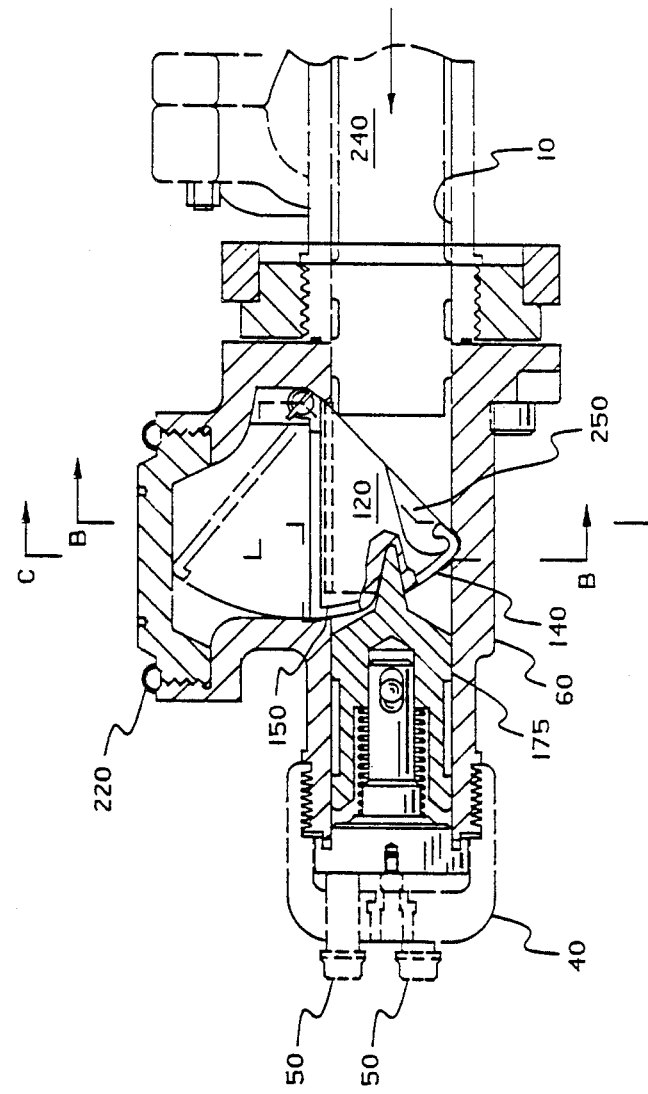
FIG. 3 is a cross-sectional view of the closure assembly shown in FIG. 2.

Shown in FIG. 3 is a fuel charge 240 passing out of nozzle 10 and just encountering swing gate 120. Swing gate 120, however, cannot be moved into the position shown in phantom due to the engagement of locking plunger 175 therewith.

Figure 4:
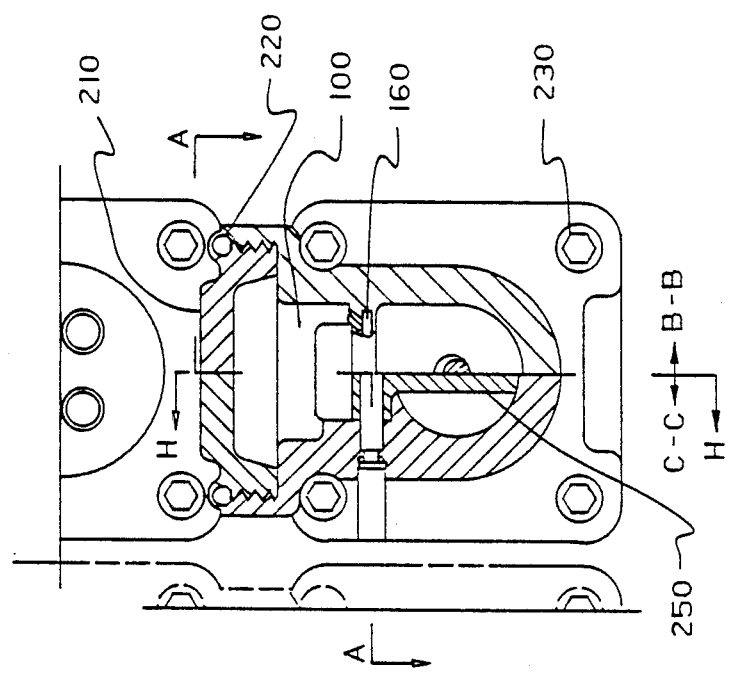
FIG. 4 is a view of the closure assembly shown in FIG. 3, the right side being a view taken along line BB of FIG. 3, and the left side being a view taken along line CC of FIG. 3.

FIG. 4 is an end-on view of the arrangement of FIG. 3. The right hand side of FIG. 4 is along crooked line BB of FIG. 3, i.e., the line passing through the access cover 210 and upper chamber 100, veering right through the pivot 160, and then veering back left to pass through seat 170. The left hand side of FIG. 4 is a view taken along line CC in FIG. 3. Considered as a whole, FIG. 4 thus shows the upper access cover 210, omega seals 220 and the placement of attachment bolts 230. FIG. 4 also shows the relative vertical positions and dimensions of upper chamber 100 and pivot 160. The left hand side shows web 250 of swing gate 120. Web 250 imparts structural rigidity to swing gate 120 and is also the element which engages a fuel spacer entering through bore 90 and transmits the force from the fuel charge which moves or "cams" swing gate 120 out of through bore 90. This function requires that web 250 have a continuous edge running from the top right hand part to the bottom left hand part through bore 90 under swing gate 120. In the presently preferred embodiment, web 250 has a simple linear edge. It will be apparent, however, that other shapes could be used to obtain satisfactory results.

Figure 5:
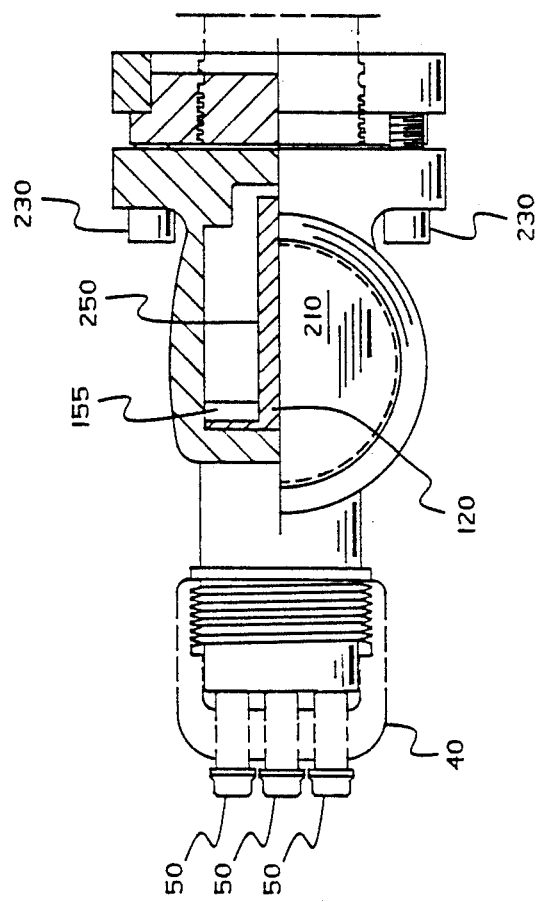
FIG. 5 is a view taken along staggered line AA in FIG. 4.

FIG. 5 is in essence a partially broken away plan view of the embodiment of FIG. 3. The relative lengthwise positioning of elements is visible in FIG. 5. It can be seen in FIG. 5 that web 250 is centrally disposed lengthwise on swing gate 120.

Figure 6:
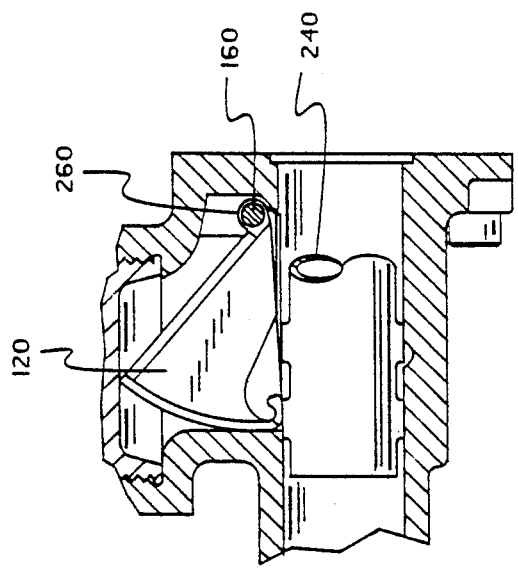
FIG. 6 is a view taken along line HH of FIG. 4.

After the locking plunger has been disengaged from the swing gate, the swing gate is free to move to its upper position in the upper chamber, as shown in FIG. 6. Also as shown in FIG. 6, the swing gate center of curvature 260 is preferably displaced upward from the axis of horizontal pivot 160. This is advantageous in that the motion of the gate does not become obstructed by particulate contaminants, and in that the gate, when in the lower position, forms a superior seal with minimal scrubbing.

Figure 7:
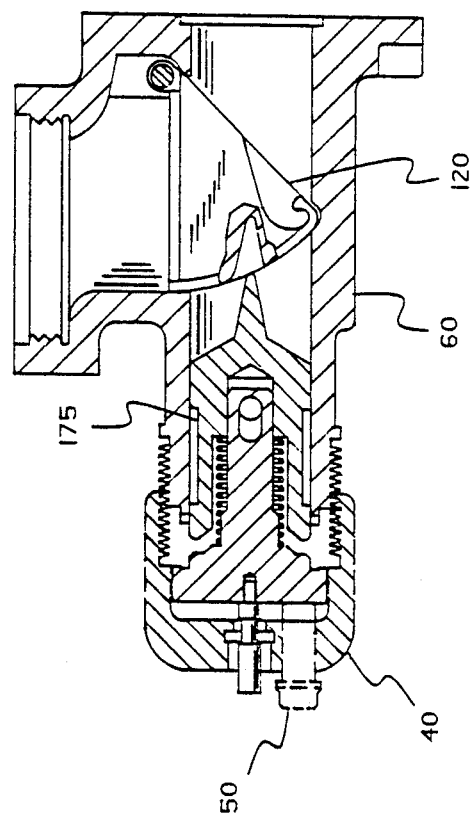
FIG. 7 is a view showing engagement of a locking plunger with a swing gate as will be described.

FIG. 7 is included to show the position of the locking plunger just before it enters swing gate 120, or just after it has left it. As can be seen, seal loading bolts 50 in the swing gate closure assembly according the present invention are used to load the locking plunger 175 and keep it securely engaged with swing gate 120.

Figure 8:
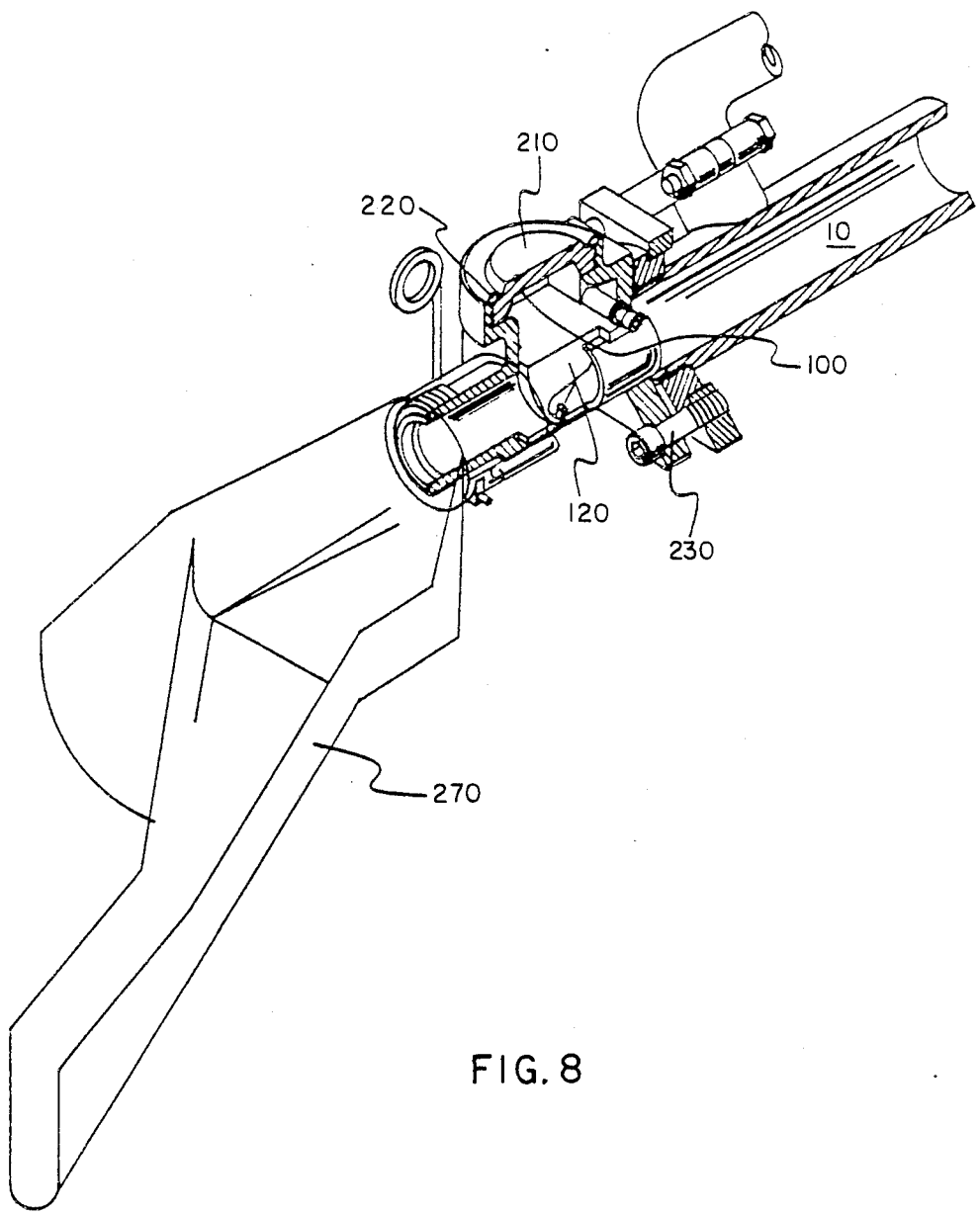
FIG. 8 is a view showing a typical application of the closure assembly shown in FIG. 2.

FIG. 8 shows the swing gate closure assembly according to the present invention as part of an overall tip off assembly, including tip off chute 270. Fuel elements and spacers comprising a fuel charge discharged from nozzle 10 pass through the swing gate closure assembly, through the chute, and into a proper receptacle.

Figure 9:
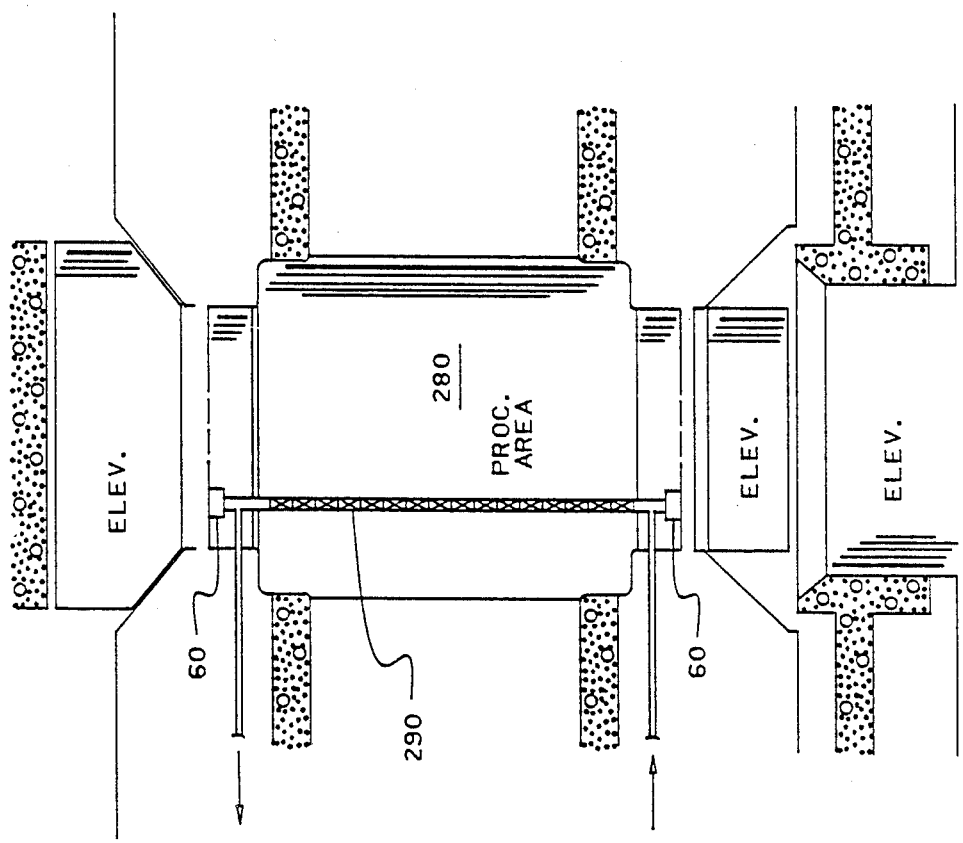
FIG. 9 is a schematic diagram of a nuclear reactor incorporating the closure assembly according to the present invention.

FIG. 9 is a schematic diagram included for the purposes of illustrating the application and positioning of a swing gate closure assembly according to the present invention in a nuclear reactor. The nuclear reactor shown in FIG. 9 includes a process area 280. Inside process area 280 is a process tube 290. Water is introduced into one end of the process tube, and flows through the other, to set up a flow within the tube. This flow tends to drive a fuel charge contained in the process tube 290 out through either one of the closure assembly bodies 60.

As mentioned above, the primary function of the closure assembly is to provide a pressure boundary seal during reactor operation, and to prevent the spray of radioactive water during the fuel charging process.

During the low pressure reactor refueling mode, nozzle cap 40 and locking plunger 175 may be manually removed from the closure assembly. The swing gate 120 preferably remains tightly closed until cammed open by the chain action of a new fuel charge. After the last fuel spacer of the fuel charge has exited the tube, the gate automatically closes against a pressure head of up to 30 psig. This automatic closing feature permits maintenance operations to be performed without subjecting personnel to radioactive water spray.

As mentioned above, the pivot point for the gate's rotation is located upstream from the seating surface and offset from the common arc construction centers. This geometry allows the gate 120 to separate from its seat 170 during opening and to operate without jamming in the presence of foreign particle build up, and to engage the seat 170 during closing with a minimum amount of scrubbing. The offset also provides a hydraulic torque on the gate which is necessary for final closing as well as for maintaining a static force and thus sealing.

Figure 10:
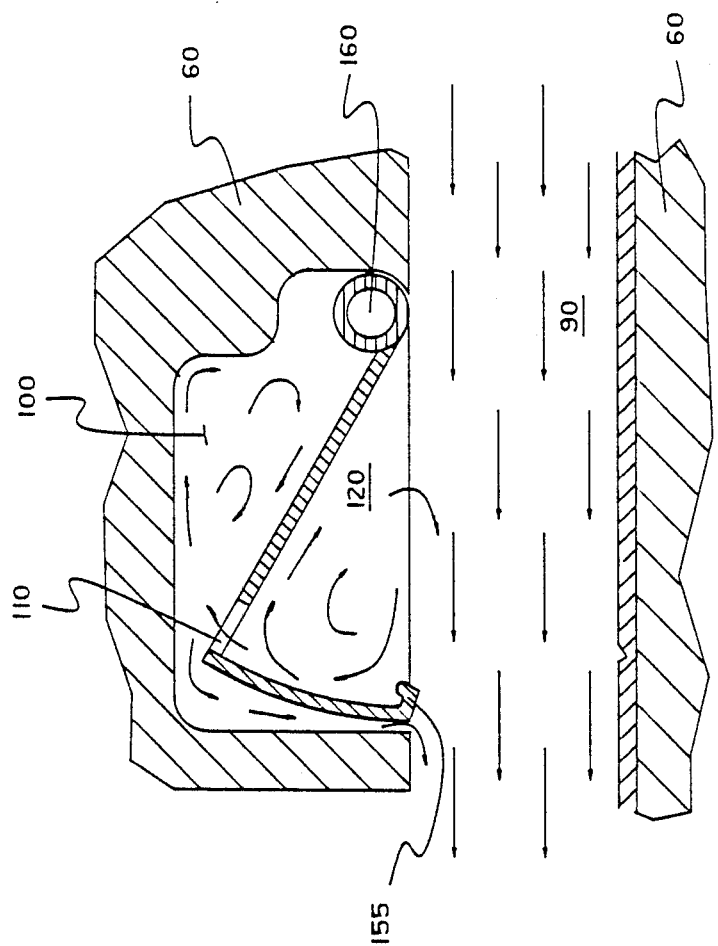
FIG. 10 is a diagram showing flow patterns in a closure assembly according to the present invention.

FIG. 10 shows dynamic flow patterns in a swing gate closure assembly according to the present invention. A unique feature is that gate 120 can swing closed against a flow stream. In essence, the swing gate and upper chamber together are analogous in operation to the operation of a piston in a cylinder. The driving forces that initiate and sustain automatic closing are derived from a combination of the gate's weight and hydraulic forces that act on the gate. The hydraulic forces are developed by a vortex flow pattern underneath the swing gate 120 and fed by the flow stream. This vortex tends to expel fluid into upper chamber 100, thus developing pressure therein which pushes downward against upper planar surface 130. These forces tend to accelerate the gate at a continuous rate until the gate is almost closed. The closing motion of the gate increases the volume of the upper chamber above the gate and tends to create a negative pressure therein. The pressure drop across orifice 110 is controlled by selecting the size of orifice 110 to provide the damping which is required to slow the gate to a desired closing speed. An excessively fast closure of the gate would not only damage closure assembly components, but would also induce a tremendous water hammer pressure surge that would potentially damage upstream piping components.

Thus, closure is effected rapidly and reliably through the controlled interaction of at least three effects. First, the offset of the center of hydraulic pressure at 260 from the pivot center 160 creates a closing force. Second, the pressure drop across the top surface of swing piston 130, as regulated by orifice 110, results in a force which urges the gate closed. Finally, the weight of gate 120 also urges the gate into the closed position, assuming, as will normally be the case, that the closure assembly is oriented as shown in the drawings.

The upward projection 155 on the center of the web of concave surface of swing gate 120 is included to engage a maintenance tool used to close gate 120 if it should ever stick open.

The present invention has been described above in terms of at least one preferred embodiment. These embodiments have been described in detail merely to provide an understanding of the invention. The invention itself, however, transcends these particular embodiments, so that many departures from and modifications to these embodiments are possible without departing from the scope of the invention. The invention should therefore not be regarded as limited to the foregoing embodiments, but instead should be regarded as being fully commensurate in scope with the following claims.

We claim:

1. A nuclear reactor tip off assembly, comprising:
   (a) a nozzle;
   (b) a closure assembly body connected to said nozzle and having an inlet adjacent said nozzle, an outlet adapted to receive a nozzle cap, and a through bore connecting said inlet and outlet, said inlet, outlet and through bore being dimensioned to permit passage of a fuel charge driven by fluid pressure in said nozzle from said nozzle through said inlet, through bore, and outlet;
   (c) a swing gate in said body and moveable between a first position in which said swing gate does not seal said through bore and a second position in which said swing gate seals said through bore, said swing gate being moved to said first position by said fuel charge during said passage; and
   (d) means in said body and in fluid communication with said inlet for hydraulically moving said swing gate to said second position in the absence of said fuel charge regardless of the presence of said fluid pressure in said closure assembly.

2. A swing gate closure assembly as claimed in claim 1 wherein said means comprises a chamber within said body and having a greater volume when said swing gate is in said second position than when said swing gate is in said first position.

3. A swing gate closure assembly as claimed in claim 2 wherein said means further comprises a curved surface on a portion of said swing gate facing said inlet when said swing gate is in said second position.

4. A swing gate closure assembly as claimed in claim 1, wherein said swing gate is arranged to pivot between said first and second position about a first axis.

5. A swing gate closure assembly as claimed in claim 4 wherein said swing gate has an arcuate surface facing said outlet when said swing gate is in said second position, said arcuate surface having an axis of curvature parallel to and displaced from said first axis.

6. A nuclear reactor tip off assembly, comprising:
   (a) a nozzle;
   (b) a closure assembly body connected to said nozzle and having an inlet adjacent said nozzle, an outlet adapted to receive a nozzle cap, and a through bore connecting said inlet and outlet, said inlet, through bore, and outlet being dimensioned to permit passage of a fuel charge driven by fluid pressure in said nozzle from said nozzle through said inlet, through bore, and outlet;
   (c) an upper chamber in said closure assembly body, above said through bore;
   (d) a swing gate having an upper substantially planar surface defining a bottom surface of said upper chamber, an arcuate surface facing said outlet and having a first center of curvature, and a substantially concave surface facing said inlet, said swing gate being pivotable about a first horizontal axis perpendicular to said through bore, adjacent said inlet, and offset from said first center of curvature, and adapted to be movable by the passage of a fuel charge through said through bore to a first position in which said swing gate does not obstruct said through bore, and, in the absence of a fuel charge in said through bore regardless of the presence of said fluid pressure, to a second position sealing said through bore;
   (e) orifice means in said swing gate for providing fluid communication between said upper chamber and said inlet; and
   (f) a closure assembly seat in said closure assembly body adapted to form a seal with said swing gate.

7. A swing gate closure assembly as claimed in claim 6, further comprising plunger means received in said outlet for locking said swing gate in said second position.

8. A swing gate closure assembly as claimed in claim 6, wherein said concave surface is convoluted about a second horizontal axis perpendicular to said through bore to form an upward projection.

9. A nuclear reactor tip off assembly, comprising:
   (a) a nozzle;
   (b) a closure assembly body connected to said nozzle and having an inlet adjacent said nozzle, an outlet adapted to receive a nozzle cap, and a through bore connecting said inlet and outlet, said inlet, through bore, and outlet being dimensioned to permit passage of a fuel charge driven by fluid pressure in said nozzle from said nozzle through said inlet, through bore, and outlet;
   (c) an upper chamber in said closure assembly body, above through bore;
   (d) a swing gate having an upper sustantially planar surface defining a bottom surface of said upper chamber, an arcuate surface facing said outlet and having a first center of curvature, and a substantially concave surface facing said inlet, said swing gate being pivotable about a first horizontal axis perpendicular to said through bore, adjacent said inlet, and offset from said first center of curvature, and adapted to be movable by the passage of a fuel charge through said through bore to a first position in which said swing gate does not obstruct said through bore, and, in the absence of a fuel charge in said through bore, and regardless of the presence of said fluid pressure, to a second position sealing said through bore;
(e) orifice means in said body for providing fluid communication between said upper chamber and said inlet; and
(f) a closure assembly seat in said closure assembly body adapted to form a seal with said swing gate.

10. A swing gate closure assembly as claimed in claim 9, further comprising plunger means received in said outlet for locking said swing gate in said second position.

11. A swing gate closure assembly as claimed in claim 9, wherein said concave surface is convoluted about a second horizontal axis perpendicular to said through bore to form an upward projection.

12. A swing gate closure assembly for a nozzle of a nuclear reactor tip off assembly, comprising:
(a) a closure assembly body connected to said nozzle and having an inlet adjacent said nozzle, an outlet adapted to receive a nozzle cap, and a through bore connecting said inlet and outlet, said inlet, through bore, and outlet being dimensioned to permit passage of a fuel charge driven by fluid pressure in said nozzle from said nozzle through said inlet, through bore, and outlet;
(b) an upper chamber in said closure assembly body, above said through bore;
(c) a swing gate having an upper substantially planar surface defining a bottom surface of said upper chamber, an arcuate surface facing said outlet and having a first center of curvature, and a substantially concave surface facing said inlet, said swing gate being pivotable about a first horizontal axis perpendicular to said through bore, adjacent said inlet, and offset from said first center of curvature, and adapted to be movable by the passage of a fuel charge through said through bore to a first position in which said swing gate does not obstruct said through bore, and, in the absence of a fuel charge in said through bore, to a second position sealing said through bore;
(d) orifice means in said swing gate for providing fluid communication between said upper chamber and said inlet;
(e) a closure assembly seat in said closure assembly body adapted to form a seal with said swing gate; and
(f) plunger means received in said outlet for locking said swing gate in said second position.

13. A swing gate closure assembly for a nozzle of a nuclear reactor tip off assembly, comprising:
(a) a closure assembly body connected to said nozzle and having an inlet adjacent said nozzle, an outlet adapted to receive a nozzle cap, and a through bore connecting said inlet and outlet, said inlet, through bore, and outlet being dimensioned to permit passage of a fuel charge driven by fluid pressure in said nozzle from said nozzle through said inlet, through bore, and outlet;
(b) an upper chamber in said closure assembly body, above said through bore;
(c) a swing gate having an upper substantially planar surface defining a bottom surface of said upper chamber, an arcuate surface facing said outlet and having a first center of curvature, and a substantially concave surface facing said inlet and being convoluted about a second horizontal axis perpendicular to said through bore to form an upward projection, said swing gate being pivotable about a first horizontal axis perpendicular to said through bore, adjacent said inlet, and offset from said first center of curvature, and adapted to be movable by the passage of a fuel charge through said through bore to a first position in which said swing gate does not obstruct said through bore, and, in the absence of a fuel charge in said through bore, to a second position sealing said through bore;
(d) orifice means in said swing gate for providing fluid communication between said upper chamber and said inlet; and
(e) a closure assembly seat in said closure assembly body adapted to form a seal with said swing gate.

* * * * *